United States Patent [19]

Garshol et al.

[11] Patent Number: 5,427,871
[45] Date of Patent: Jun. 27, 1995

[54] GALVANIC SEAWATER CELL

[75] Inventors: Tor Garshol, Frey; Oistein Hasvold, Oslo, both of Norway

[73] Assignee: Forsvarets Forskningsinstitutt, Kjeller, Norway

[21] Appl. No.: 98,302

[22] PCT Filed: Feb. 6, 1992

[86] PCT No.: PCT/NO92/00021
§ 371 Date: Dec. 3, 1993
§ 102(e) Date: Dec. 3, 1993

[87] PCT Pub. No.: WO92/14272
PCT Pub. Date: Aug. 20, 1992

[30] Foreign Application Priority Data

Feb. 7, 1991 [NO] Norway ................. 910466

[51] Int. Cl.⁶ ............................. H01M 4/64
[52] U.S. Cl. ....................... 429/119; 429/188; 429/238
[58] Field of Search ............. 429/119, 188, 238

[56] References Cited

U.S. PATENT DOCUMENTS

| | | |
|---|---|---|
| 1,447,657 | 3/1923 | Gouin et al. |
| 2,590,584 | 3/1952 | Taylor ................. 429/119 X |
| 3,674,564 | 7/1972 | Ketler . |
| 3,907,596 | 9/1975 | Ketler . |
| 4,016,339 | 4/1977 | Gray et al. ............. 429/119 X |

FOREIGN PATENT DOCUMENTS

0559302  5/1977  Switzerland .

*Primary Examiner*—Stephen Kalafut
*Assistant Examiner*—M. Nuzzolillo
*Attorney, Agent, or Firm*—Robbins, Berliner & Carson

[57] ABSTRACT

This invention relates to galvanic seawater cells and batteries and in particular to cathodes which are suitable for use in galvanic cells that use an oxidant dissolved in the electrolyte as depolarizer. An example of such cells are seawater cells which use the oxygen dissolved in the seawater as oxidant. The cell has an inert electrode which consists of a number of conducting fibers (1,3,14) connected to a conducting body (2,4,15). The fibers (1,3,14) have different orientations relatively to each other and to the body (2,4,15). In a preferred embodiment the electrode body (2,4) consists of two or more wires which are twisted together to constitute an electrode stem while clamping the fibers (1,3) in a fixed position between the wires, as in a laboratory bottle brush.

20 Claims, 6 Drawing Sheets

GALVANIC SEAWATER CELL

The present invention relates to galvanic seawater cells and batteries and in particular to cathodes which are suitable for use in galvanic cells that use an oxidant dissolved in the electrolyte as depolarizer. An example of such cells are seawater cells which use the oxygen dissolved in the seawater as oxidant.

Low power seawater cells with inert cathodes which use the oxygen dissolved in the seawater as the oxidant and a consumable anode have been known for a long time. One example is described in the International Patent Application No. WO 89/11165 (O. Hasvold 3). These cells have been successfully operated in the sea for more than two years. They use an inert metal cathode (titanium or stainless steel) which is coated with a catalyst that catalyzes the reduction of oxygen. In batteries, the cells are connected in parallel, and the cell voltage is converted to a useful value by a DC/DC converter. The consumable anode can be any electronegative metal or alloy made of e.g. lithium, magnesium, aluminum or zinc.

Seawater batteries are attractive as they have a very high energy density which compares favorably with the best batteries presently available. As these batteries use the sea both as electrolyte and oxidizer, they can be stored in a dry condition for a very long time without any notable degradation. Additionally, seawater batteries with magnesium anodes alloyed with aluminum, zinc or manganese pose no safety hazards, as they are neither flammable nor do they contain any elements which are considered toxic to the environment.

The chemical reactions in a typical seawater battery with magnesium anodes are:

$2Mg = 2Mg^{++} + 4e^-$ (anode reaction)

$O_2 + 2 H_2O + 4e^- = 4OH^-$ (cathode reaction)

$2Mg + 2H_2O + O_2 = 2Mg^{++} + 4OH^-$ (cell reaction)

As magnesium ions are present in the seawater already, seawater batteries with magnesium anodes are environmentally harmless.

The cathodes are not influenced by the cell reactions, therefore a discharged battery can be recharged mechanically by inserting new magnesium anodes. If deteriorated by biofouling or calcareous deposits on the cathodes, cathode cleaning may be necessary.

Whereas the energy content of the battery is limited by the amount of anode material and the cell voltage under load, the power from practical batteries is determined by the rate of oxygen reduction. This rate is limited by the cathode surface area available and by the transport of oxygen to cathode surface. In previous designs, loosely packed metal wool coated with a catalyst as in the mentioned WO 89/11165 or expanded metal as described in PCT/N090/00056 (O. Hasvold 5-1-1) have been used as cathodes in seawater cells.

The reduction of oxygen consists of the following steps:
1. The transport of oxygen by convection and by diffusion to the electrode surface
2. The electrochemical reaction at the electrode surface
3. The transport of the reaction products away from the electrode surface The more efficient the transport steps are, the more oxygen is available for the cathode reaction and the lower is the pH increase at the catalyst cathode surface. The importance of minimizing the pH increase at the surface is caused by the need to avoid calcareous deposits in and on the cathode surface. Seawater contains magnesium and calcium ions together with hydrogen carbonate ions. The cathode reaction causes a pH increase at the cathode surface and if high enough, this will lead to precipitation of calcium and magnesium salts e.g.:

$Ca^{++} + HCO_3^- + OH^- = CaCO_3 + H_2O$ and $Mg^{++} + 2OH^- = Mg(OH)_2$

These reactions are considered beneficial in cathodic protection of metal structures in seawater against corrosion as the calcareous layer decreases the current necessary to protect the structure. In seawater cells, formation of calcareous layers is detrimental as the cell power will be reduced. As seawater is nearly saturated with calcium carbonate, formed deposits do not redissolve.

To ensure a high surface area of the cathode, the inert metal can be in the form of wool sandwiched between two layers of metal net or expanded metal, as mentioned above. The packing of the wool is loose to ensure a low resistance to convection (flow through) and thus to provide an free flow of fresh, oxygen rich seawater through the cathode structure. Additionally, the cell must have an open structure to allow free access of fresh seawater and to get rid of the reaction products formed.

If such a cells is used close to the water surface under conditions of strong wave action, the wool structure may be mechanically destroyed unless a very stiff quality is used. Also, close to the surface, biofouling (for example of algae, barnacles and mussels) will be a problem which increases with time unless copper or a copper alloy is used as cathode. The corrosion of copper will normally leak sufficient amount of copper ions to function as an excellent antifouling as long as the cathode potential is not lowered too much from the free corrosion potential of the metal. As the corrosion potential of copper is low compared to the potential of catalyzed cathodes under load, the cell voltage of copper based seawater cells is roughly not more than 1.0 V compared to 1.6 V for cells using catalyzed stainless steel. Copper is, however, a very soft metal and copper-wool cathodes do not have sufficient strength to be used under rough conditions. Metal plate cathodes may be used, but unless the diffusion layer is disrupted by for example perforation of the plates, thereby reducing the characteristic length in the direction of the water flow, the maximum current density they can support, is low.

One parameter which is used to describe material transport is the limiting current density. This is the current density where the concentration gradient of the electroactive reactant has its maximum, i.e. when the reactant concentration is zero at the electrode surface. It is well known from textbooks in electrochemistry that the limiting current density increases with increasing reactant concentration, electrolyte velocity and decreasing size of the electrode.

For laminar flow over a flat plate, the mass transport limiting current density for plates is according to a textbook by K J Vetter: "Electrochemical Kinetics", published by Academic Press, New York 1967, proportional to the reactant concentration and the square root of the flow velocity and inversely proportional to the square root of the length of the plate in the direction of flow.

Thus it is obvious that the extension of the electrode in the direction of flow should be as small as technically possible. Further, the resistance to flow should be low to allow a high flow velocity within the cathode. This can be achieved with cathodes made from expanded metal or metal net. The expanded metal sheet(s) may be coiled into a stiff structure as described in the international application PCT/N090/00056. If the cathode consists of wires which are so thin that their thickness is comparable to the thickness of the diffusion layer, cylindrical diffusion will further increase the mass transport limiting current density and thus the maximum current density the cathode can support.

The problem with cathodes made from thin wires or fibers is their lack of mechanical strength and stiffness. In the form of wool, the fibers will tend to stick together and even if the structure is initially loose with a low resistance to flow through the structure, hydrodynamic forces from wave action and sea currents together with the gravity force will break up the structure and if placed in a metal net basket, the fibers will end up compressed in the bottom of the basket.

The object of the present invention is to provide a galvanic cells which has an improved cathode structure as compared to known cathodes. The main features of the invention are defined in the claims.

The invention takes advantage of the high specific surface area and the high limiting current density of thin fibers. The fibers are separated from each other and surrounded by free flowing seawater. (If the fibers stick together, as in a woven cloth or a mat, only the outer surfaces will be supplied with fresh oxygen containing seawater). At the same time, good electrical contact is maintained. Thus the ideal geometry of the fibers is considered to be similar to that of a common laboratory bottle brush.

Above mentioned and other features and objects of the present invention will clearly appear from the following detailed description of embodiments of the invention taken in conjunction with the drawings, where.

Figure 1:
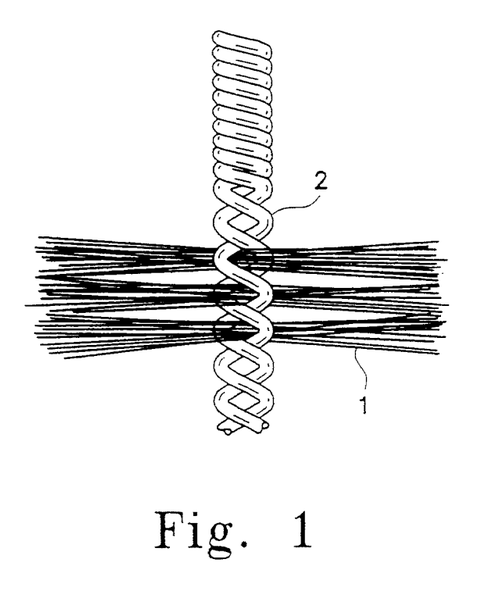
FIG. 1 shows the principles of a cathode fiber structure.
Figure 2:
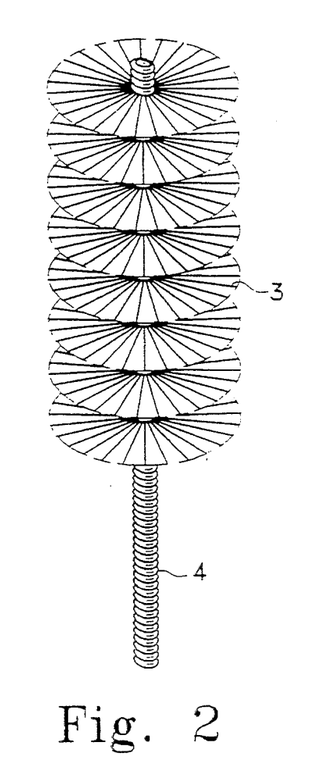
FIGS. 2 and 3 show an example of a cathode 'bottle brush' structure.
Figure 3:
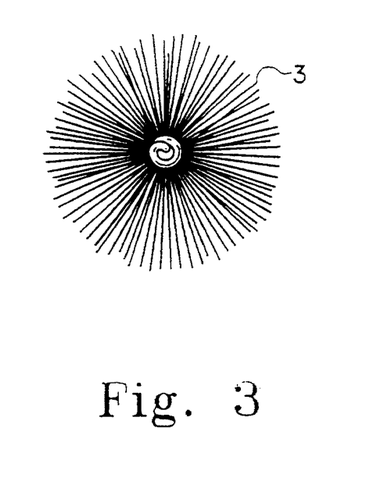

FIGS. 1, 2 and 3 show electrodes having a bottle brush structure. Here the fibers 1 and 3 are radially spread out which gives fresh seawater free access to the whole fiber surface. Current collection from the fibers is done through an electrode body or stem 2 or 4 which is made from metal wire. The metal wire in the stem may be made of any conducting alloy which is stable at the potentials of interest. Typical materials are titanium, stainless steel, silver or copper.

The current collecting stem 2,4 consists of two or more wires which are twisted together to constitute an electrode stem while clamping the fibers 1,3 in fixed positions between the wires. The conducting wires 2,4 are twisted in such a manner that they form a double helix, while clamping the fibers 1,3 as in a laboratory bottle brush. The wires 2,4 may be twisted in a SZ fashion, i.e. one part of the stem is twisted on one direction, another part(s) in the other direction.

The fibers may also be made from any conducting material which is stable in seawater, for example copper or silver alloys (for use where biofouling is a problem), catalyzed stainless steel, titanium and/or carbon, in any combination. Of particular interest are carbon fibers as carbon is a well known catalyst for the reduction of oxygen. This catalytic activity can be further increased by surface modifications as described in the book "The electrochemistry of carbon", editors: Sarangpani S, Akridge J R, and Schumm B. "The Electrochemical Society Inc". (1984).

Carbon fibers, including graphite fibers, have a high modulus of elasticity which make even thin fibers fairly stiff. This stiffness allows brush cathodes to keep their shape in the moving seawater.

Figure 4:
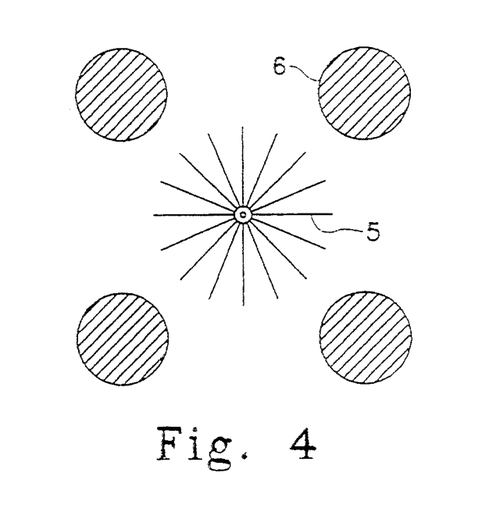
FIG. 4 shows a top view of a cell having a 'brush' cathode.
Figure 5:
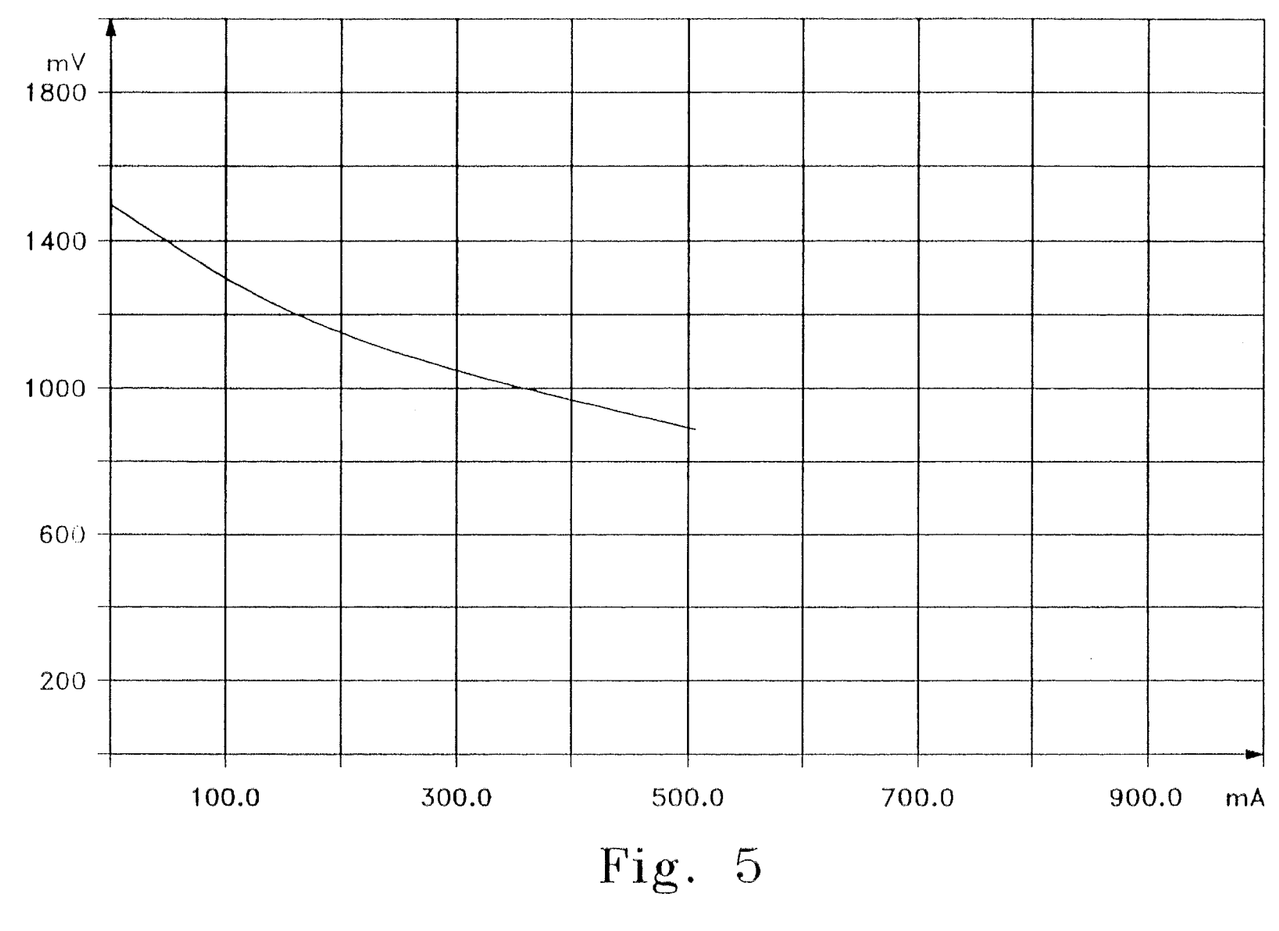
FIGS. 5 and 6 show performance curves for the FIG. 4 cell.
Figure 6:
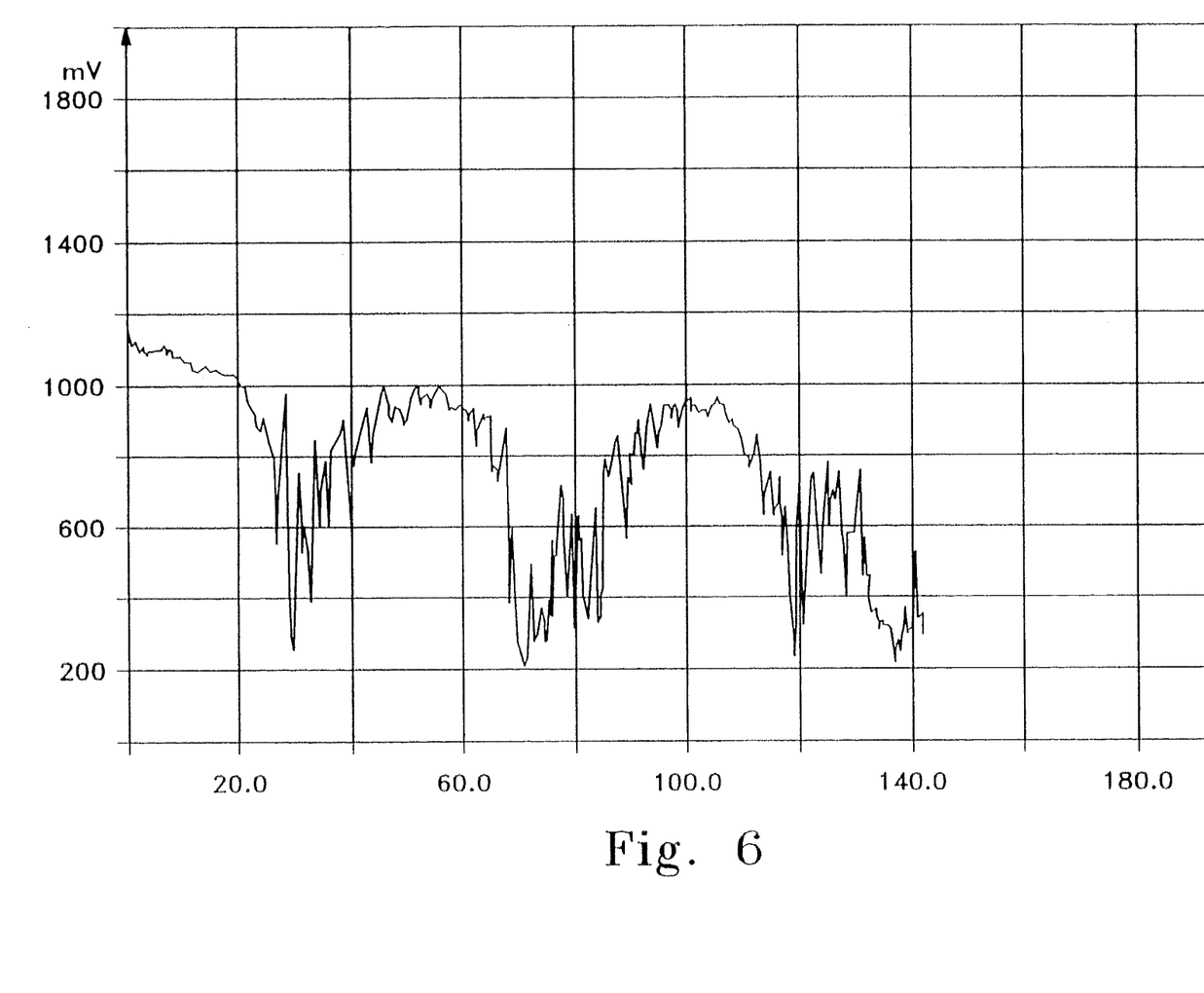

A carbon fiber cathode according to FIGS. 1, 2 and 3 was made from a yarn consisting of 3000 fibers, each with a diameter of 7000 nm. the stem was made from stainless steel wire. After the production of the 'brush', the 'brush' was treated with a solvent to remove the sizing of the yarn fibers and heat treated in air to separate the fibers from each other and to improve the catalytic activity of the fiber surface. Each cathode had a diameter of 30 mm and a height of 150 mm. In a test cell, the cathode brush 5 was surrounded by four magnesium anodes 6, as shown in FIG. 4, which shows a top view of the cell. The performance of the cell (Cell Voltage (mV) versus Current (mA)) is shown in FIG. 5 which was measured in a location with strong sea currents and high seawater salinity. Even so, the performance is considered exceptionally good compared to cells made with catalyzed stainless steel wool cathodes of similar size. FIG. 6 shows the performance of the cell (Cell Voltage (mV) versus time (h)) at constant load in a location with lower salinity and less current. The load was 250 mA. The dips in the cell voltage are caused by periods with nearly stagnant water.

Figure 7:
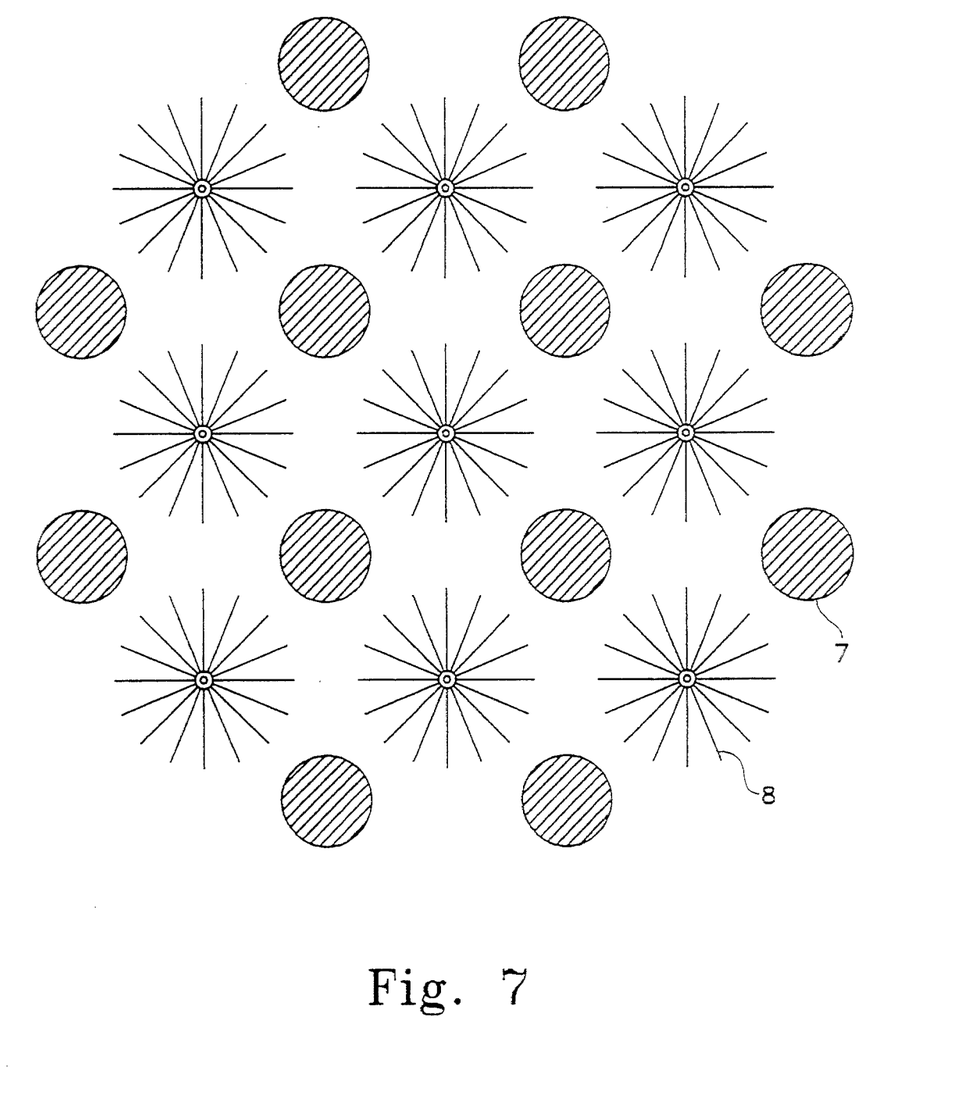
FIG. 7 shows a top view of a prototype cell usable for sonobuoys.

FIG. 7 shows the top view of a typical electrode configuration for a seawater cell which may be usable for sonobuoys. The cell consists of twelve anodes 7 and nine cathode elements 8. The height of the electrodes are 150 mm and the cell can be confined in a cylinder with 150 mm diameter. The cell capacity (when the anode diameter has been reduced by 50%) is 600 Ah and a typical cell load is 2.7 A or less corresponding to a discharge time of nine days or more. Increased power and capacity can be achieved simply by increasing the length of the electrodes. The cathode length of 150 mm is just convenient for prototype production, but cathodes of any length may be produced. The electrodes were all connected in the top and the connections covered with a polymer.

Other cell geometries may also be realized with bottle brush cathodes, as for example a cylindrical cell somewhat like the inverse of FIG. 4, having a central anode rod and a number of parallel cathode brush elements arranged in an annulus around the anode.

Figure 8:
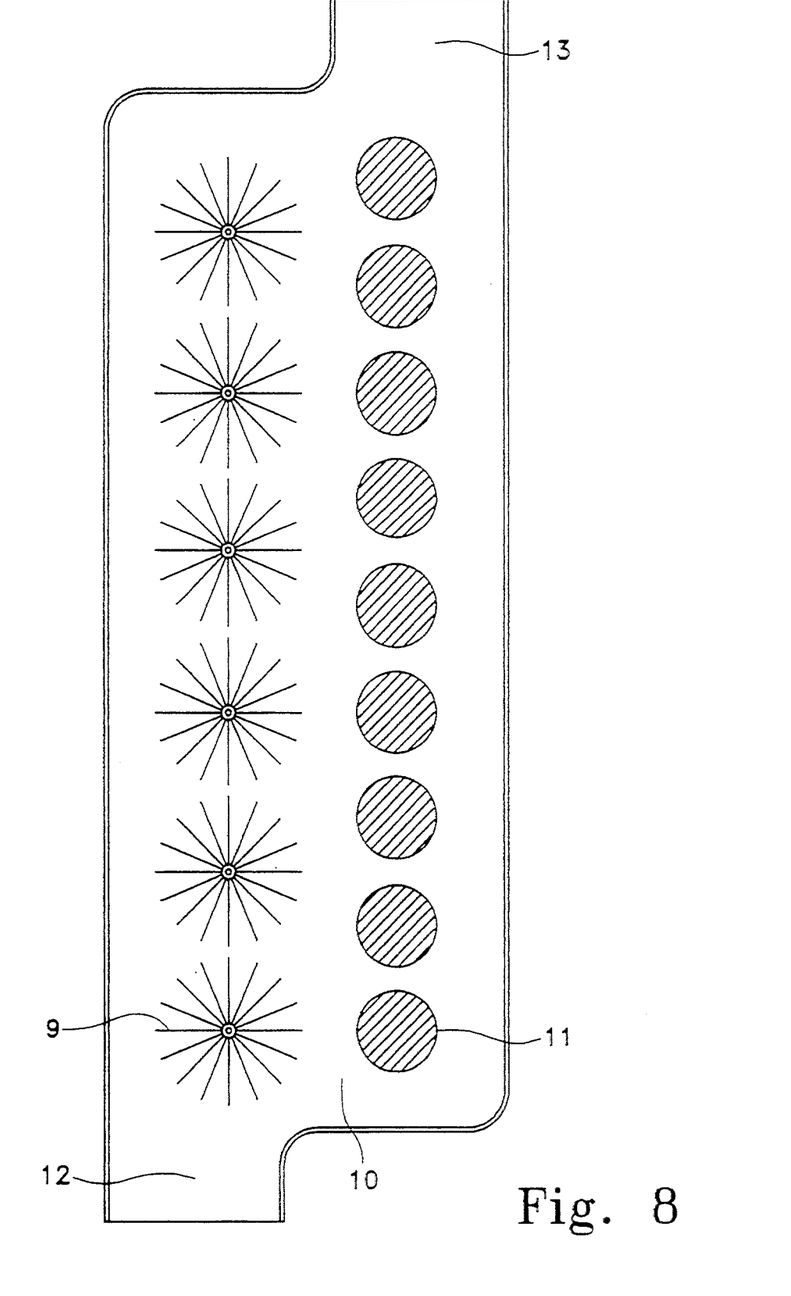
FIG. 8 shows a compartment cell structure.

Bottle brush cathodes may also be used in cells which are intended for vehicle propulsion. In this case, the direction of flow is known as either the pressure differences caused by the vehicles's motion through the sea or dedicated seawater pumps are used to move the seawater through the cells. Also cell types as shown in FIG. 7 may be used for traction, but as solid products of the cell reaction may collect in the cathodes, a cell as shown in FIG. 8 may be preferred. In this cell, the seawater passes through a row of cathodes 9 before it enters the anode compartment 10. In this figure, the anodes 11 are in the form of parallel rods, but other shapes which offers low resistance to the flow such as perforated magnesium plates (grates) may also be used. If a higher power is needed than possible with the natural concentration of oxygen in seawater (approximately 0.3 mol/m$^3$), the oxidant concentration can be increased through the addition of a suitable oxidant such as hydrogen peroxide, oxygen or chlorine to the seawater.

In order to reduce the size and cost of the DC/DC converter usually used in connection with the cells, seawater cells for traction are serially connected. Leakage current between cells is kept at an acceptable level through the use in inlet 12 and outlet 13 ducts for the seawater. The resistance of the ducts increases with duct length and decreases with the cross section of the duct. The cell has an enclosure which is open to the ocean in two opposing ends leading the seawater past the cathode at substantially right angles to the cell structure with forced convection.

'Bottle brush' cathodes are believed to be the best choice among 'brush' cathodes as their radial geometry makes the whole fiber surface easily accessible. With thin fibers, the fibers are moved by the moving water which makes their hydrodynamic resistance under conditions of very strong current low. This is also the reason why they do not easily clog: large particles just slip through the cathode in contrast to flow through felt cathodes which filters the seawater. Last but not least, bottle brush cathodes are easy to product.

Figure 9:
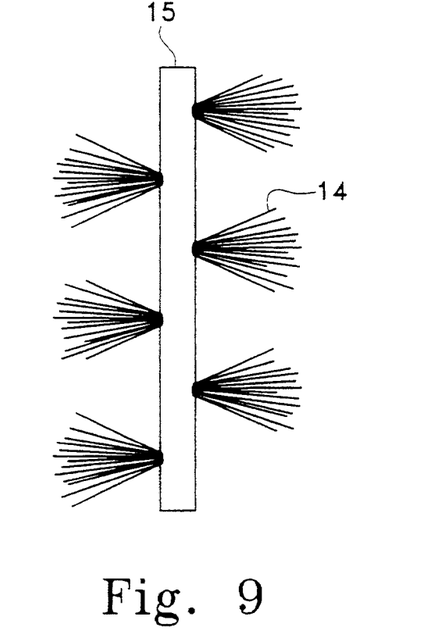
FIGS. 9, 10 and 11 show alternative cathode embodiments.
Figure 10:
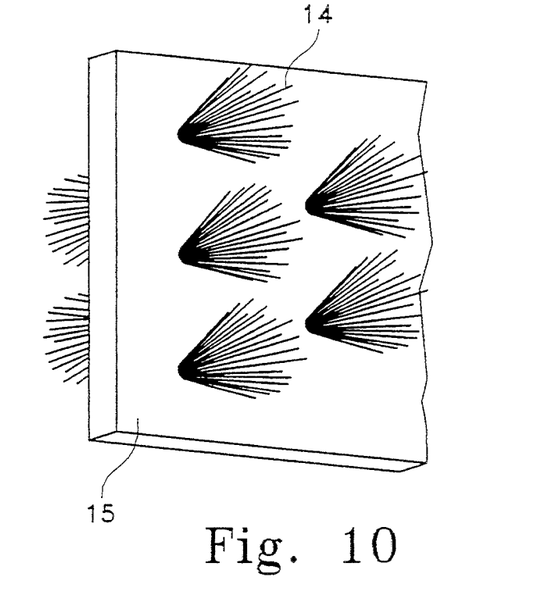
Figure 11:
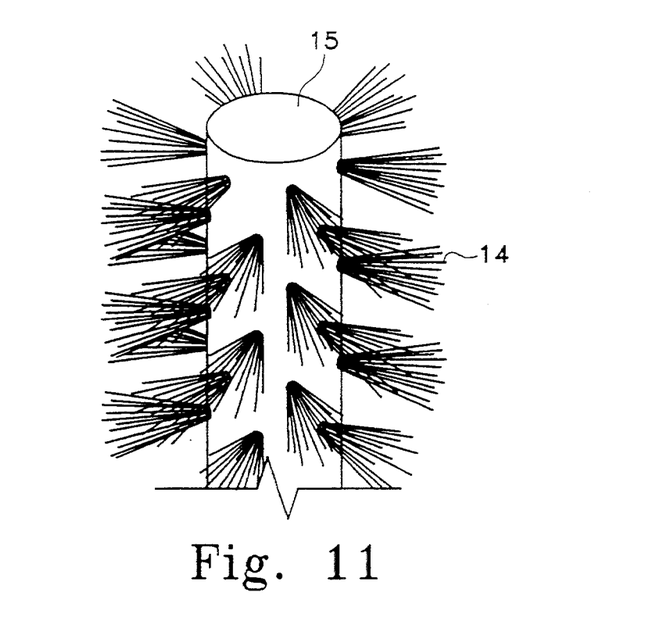

Other 'brush' geometries may also be used for cathodes in seawater cells. Examples are shown in FIGS. 9, 10 and 11. The 'brush' has the fibers 14 inserted into holes in a current collecting structure 15 resulting in fibers 14 having orientations which are within plus/minus 45 degrees of the normal vector to the adjacent surface of the conductive body 15. Although inferior to bottle brush cathodes of comparable sizes, these can deliver more current than a perforated plate of the same size.

In general, the inert cathode (electrode) of the galvanic cell may consist of a number of conducting fibers 1,3,14 connected to a current collecting body 2,4,15 in such a manner that a substantial part of the fibers are oriented in directions substantially different from the plane of the body at the connection between the fiber and the body. The fibers 1,3,14 may have different orientations relative to each other and to the body 2,4,15.3. The fibers may have orientations which are within plus/minus 45 degrees of the normal vector to the plane or to the main axis of the body. Preferably each fiber should be oriented approximately perpendicular to normal to the surface of the body. Whereas usually the fibers will have the same length and diameter, a substantial part or some of the fibers 1,3,14 may have different lengths and/or different diameters.

We claim:

1. Galvanic seawater cell for use with seawater as an electrolyte and with oxygen, hydrogenperoxide or chlorine dissolved in the seawater as an oxidant, said cell comprising:
   at least one anode element; and
   at least one cathode element, each said cathode element further comprising
   a plurality of electrochemically active conductive fibers,
   a current collecting conductive body extending along a main axis, and
   means for physically and electrically connecting said fibers to said current collecting conductive body such that a substantial portion of each of said fibers extends outwardly from a respective adjacent surface portion of said current collecting body, and said fibers are substantially uniformly distributed about said main axis.

2. Cell according to claim 1, wherein in each said cathode element, each said substantial portion of the same length and is oriented substantially radially about said main axis.

3. Cell according to claim 1, wherein in each said cathode element, each of the fibers is oriented within plus/minus 45 degrees of the normal vector to a plane defined on an adjacent surface of the current collecting body.

4. Cell according to claim 3, wherein in each said cathode element, each of the fibers is oriented approximately normal to an adjacent surface portion of the body.

5. Cell according to claim 1, wherein not all of the fibers have a same length.

6. Cell according to claim 1, wherein said electrochemically active fibers are formed from materials selected from the group consisting of carbon, inert metals, and mixtures thereof.

7. Cell according to claim 1, wherein the current collecting body of each cathode element is formed from an inert metal.

8. Cell according to claim 1, wherein the current collecting body of each cathode element is in the form of an electrode stem consisting of two or more wires which are twisted together about said main axis to clamp each of the fibers in a respective fixed position between the wires.

9. Cell according to claim 8, wherein one part of the stem is twisted in a first direction and another part of the stem is twisted in a second direction opposite said first direction.

10. Cell according to claim 1, comprising a plurality of said anode elements which collectively constitute an anode of said cell and a plurality of said cathode elements which collectively constitute a cathode of said cell.

11. Cell according to claim 10, wherein the cell is open to the seawater and said plurality of anode elements are interleaved with said plurality of cathode elements.

12. Cell according to claim 10, wherein said anode elements are arranged in one or more parallel anode rows and said cathode elements are arranged in one or more parallel cathode rows.

13. Cell according to claim 10, wherein said anode elements and said cathode elements are confined within a common compartment through which said seawater electrolyte flows along a predetermined path.

14. Cell according to claim 13, wherein the seawater electrolyte flows first through the cathode elements and then through the anode elements.

15. Cell according to claim 14, further comprising means for causing the seawater to flow past the cathode elements at substantially right angles to the axis of the respective current collecting conductive bodies.

16. Cell according to claim 1, wherein the current collecting conductive body consists of a current collecting matrix provided with a plurality of apertures into which the electrochemically active conductive fibers are inserted.

17. Cell according to claim 1, wherein the outwardly extending portions of the fibers are deflected as the seawater flows through the cell.

18. Cell according to claim 6 wherein the fibers are formed from carbon.

19. Cell according to claim 6 wherein the fibers are formed from an inert metal selected from the group consisting of stainless steel, copper, copper alloys, silver, titanium, and combinations thereof.

20. Cell according to claim 7 wherein the inert metal is selected from the group consisting of stainless steel, copper, copper alloys, silver, titanium, and combinations thereof.

* * * * *